US012754766B2

(12) United States Patent
Zhou et al.

(10) Patent No.: US 12,754,766 B2
(45) Date of Patent: Oct. 6, 2026

(54) NEURAL NETWORK ACCELERATION VIA GRAPH PARTITION

(71) Applicant: Black Sesame International Holding Limited, San Jose, CA (US)

(72) Inventors: Ting Zhou, Santa Clara, CA (US); Fen Zhou, Santa Clara, CA (US); Yi Wang, San Jose, CA (US); Zexi Ye, Santa Clara, CA (US); Wei Zuo, Cupertino, CA (US); Zheng Qi, Cupertino, CA (US); Qiang Zhang, Campbell, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 1312 days.

(21) Appl. No.: 17/357,288

(22) Filed: Jun. 24, 2021

(65) Prior Publication Data

US 2022/0414438 A1 Dec. 29, 2022

(51) Int. Cl.
*G06F 9/50* (2006.01)
*G06N 3/063* (2023.01)

(52) U.S. Cl.
CPC ............... *G06F 9/50* (2013.01); *G06N 3/063* (2013.01)

(58) Field of Classification Search
CPC ............. G06F 9/50; G06N 3/063; G06N 3/04
See application file for complete search history.

(56) References Cited

U.S. PATENT DOCUMENTS

| | | | | |
|---|---|---|---|---|
| 9,407,944 B1 * | 8/2016 | Galdy | H04N 21/2402 | |
| 10,841,810 B2 * | 11/2020 | O'Shea | H04W 16/18 | |
| 12,190,086 B1 * | 1/2025 | Hanebutte | G06F 16/9024 | |
| 2004/0177244 A1 * | 9/2004 | Murphy | G06F 9/5077 | 713/100 |
| 2004/0177245 A1 * | 9/2004 | Murphy | G06F 9/44505 | 713/100 |
| 2006/0277391 A1 * | 12/2006 | Bittner, Jr. | G06F 9/4494 | 712/201 |
| 2009/0300615 A1 * | 12/2009 | Andrade | G06F 9/5066 | 718/100 |

(Continued)

FOREIGN PATENT DOCUMENTS

| | | |
|---|---|---|
| CN | 108292241 A | 7/2018 |
| CN | 108351805 A | 7/2018 |

(Continued)

OTHER PUBLICATIONS

Jiaying Gu;Fei Fu;Qing Zhou, Penalized estimation of directed acyclic graphs from discrete data; Statistics and computing, vol. 29, Dec. 31, 2018.

(Continued)

*Primary Examiner* — Benjamin C Wu
(74) *Attorney, Agent, or Firm* — Timothy T. Wang; Panorama IP Group PLLC

(57) ABSTRACT

A method of constructing sub-graphs, includes receiving a directed acyclic graph (DAG), partitioning the directed acyclic graph into an at least one section, determining at least one hardware attribute, determining at least one DAG hardware limitation of the at least one section and determining a largest continuous node list of the at least one section in which the at least one hardware attribute meets the at least one DAG hardware limitation.

10 Claims, 12 Drawing Sheets

(56) References Cited

U.S. PATENT DOCUMENTS

| | | | | |
|---|---|---|---|---|
| 2010/0156888 | A1* | 6/2010 | Luk | G06T 1/20 345/418 |
| 2018/0089002 | A1* | 3/2018 | Xia | G06F 1/324 |
| 2018/0300181 | A1* | 10/2018 | Hetzel | G06F 9/5055 |
| 2018/0337976 | A1* | 11/2018 | Crawford | H04L 41/12 |
| 2018/0373540 | A1* | 12/2018 | Bao | G06F 9/5038 |
| 2019/0286972 | A1 | 9/2019 | El Husseini et al. | |
| 2020/0082242 | A1 | 3/2020 | Jin et al. | |
| 2020/0082243 | A1 | 3/2020 | Jin et al. | |
| 2020/0082898 | A1 | 3/2020 | Jin et al. | |
| 2021/0049465 | A1* | 2/2021 | Bogdan | G06N 7/01 |
| 2021/0174190 | A1 | 6/2021 | Janssen et al. | |
| 2022/0366217 | A1* | 11/2022 | Singh | G06N 3/063 |
| 2022/0414438 | A1* | 12/2022 | Zhou | G06N 3/063 |

FOREIGN PATENT DOCUMENTS

| | | | |
|---|---|---|---|
| CN | 108364327 | A | 8/2018 |
| CN | 111860816 | A | 10/2020 |
| CN | 111860820 | A | 10/2020 |

OTHER PUBLICATIONS

Shuixia Hao, Guosun Zeng, Yiming Tan; A method of Heterogeneous and Reconfisurable Task Partitioning Based on DAG; Journal of Tongji University (Natural Science), vol. 39, No. 11, Nov. 2011.

Antao Yin, Gang Qian, Huanhuan Shi, Finding K Dense Subg r aphs With Limited Ove r Lap in Complex Netwo r k, Computer Applications and Software, vol. 33, No. 12, Dec. 2016.

* cited by examiner

NEURAL NETWORK ACCELERATION VIA GRAPH PARTITION

BACKGROUND

Technical Field

The instant disclosure is related to neural network acceleration and more specifically to neural network acceleration via graph partition.

Background

Currently, the size of neural networks has been increasing. A larger neural network may not be able to run on one accelerator or device due to resource constraints such as memory.

SUMMARY

An method of constructing sub-graphs, comprising, receiving a directed acyclic graph (DAG), partitioning the directed acyclic graph into an at least one section, determining at least one hardware attribute, determining at least one DAG hardware limitation of the at least one section and determining a largest continuous node list of the at least one section in which the at least one hardware attribute meets the at least one DAG hardware limitation.

Another method of assigning a stripe size in a sub-graph, including, receiving a directed acyclic graph, partitioning the directed acyclic graph into an at least one section, determining an input tensor stripe size and updating an at least one hardware attribute based upon the input tensor stripe size.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
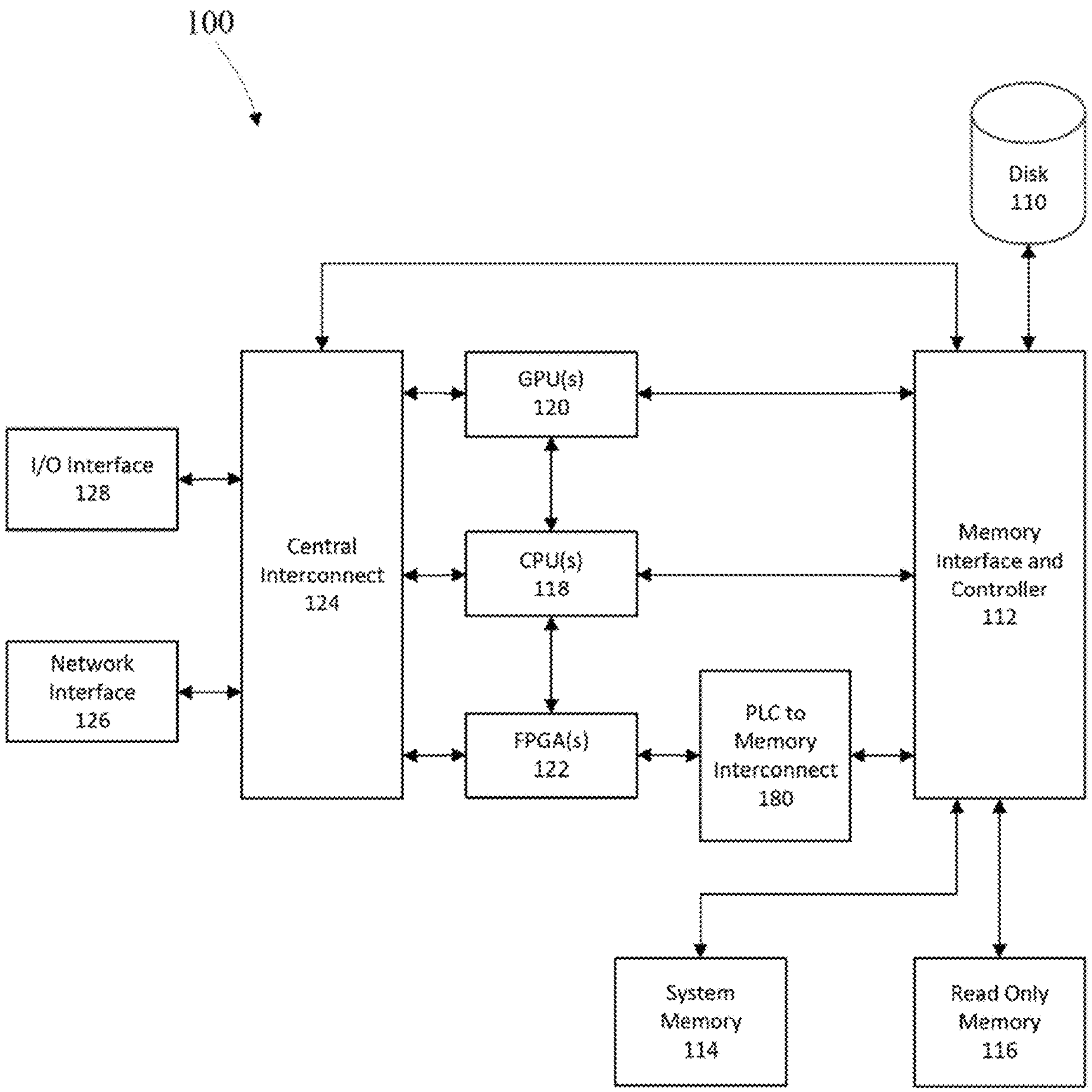
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
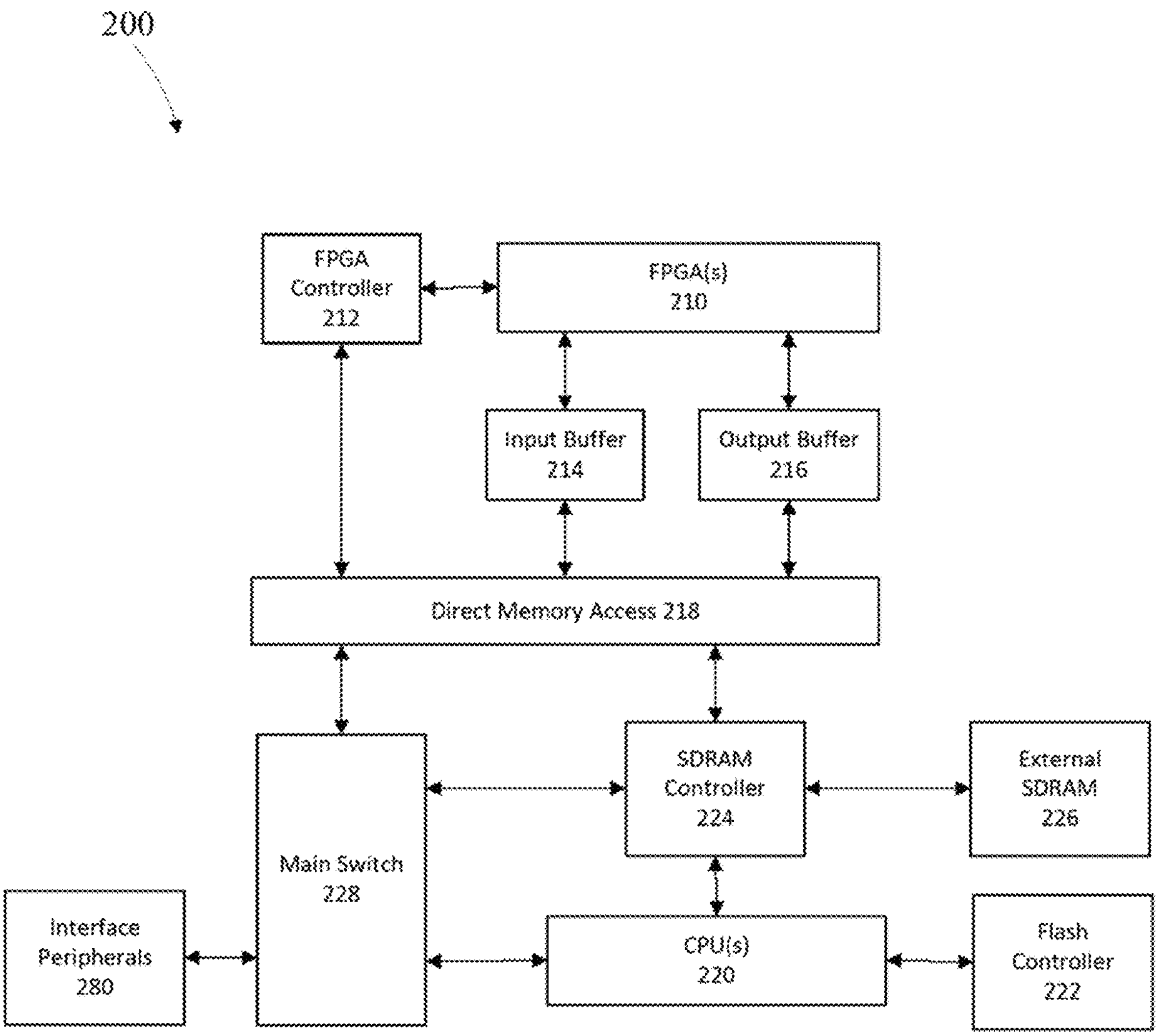
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

With the increased use of neural networks in the environment of ubiquitous micro-computing may lead to resource limitations with respect to computational processing power and memory for a platform. One possible solution to running neural networks on resource constrained hardware systems may be to segment the original neural network graph into multiple sub-graphs and allow the multiple sub-graphs to be executed available subsystems. Graph partitioning may provide a possible solution for resource limited artificial intelligence applications.

Given a neural network, one method to ease execution would be to segment the neural network into multiple sub-networks. One measure of execution efficiency may be to determine a hardware utilization percentage as a cost function for different partitioning schema. Methods may additionally be utilized to determine which partition schema runs most efficiently for that particular platform.

The partitioning of the graph into smaller subgraph segments allows it to be loaded onto available hardware. Often, artificial intelligence chips may not be capable of loading an entire graph onto the chip, as in the case of a large node, for example, a convolutional network with high depth. Additionally, there may be rules applied during graph partitioning based on hardware limitations such as limiting a concatenation node to be located at a boundary which further limits graph segmentation options.

Examples of one possible solution may be to permit different operators to run on different hardware such as arrays, DSPs and the like, and allow the large graph to be separated into multiple small sub-graphs, allowing the sub-graphs to meet hardware limitations. An example of the possible solution may be to allow a determination of an efficient execution order of those sub-graphs on the available hardware.

Definitions:

Boundary: Last node of a section, includes the last node name and section input parameters.

BTMW: Byte tensor move mask and weight.

BTMD: Byte tensor direct memory access input and output.

DAG: Directed acyclic graph, low level intermediate representation of artificial intelligence chip, passes graph information to chip.

DBUF: Data buffer of node input values and node output values.

DMA_IN: Direct memory access input tensor.

DMA_OUT: Direct memory access output tensor.

Graph: Abstract level description of neural network model.

NNX: Neural network exchange.

OVBUF: Overlap buffer.

Partition: Operation that divides a larger section of code into multiple smaller sections of code.

Section: Sub-graph.

Figure 3:
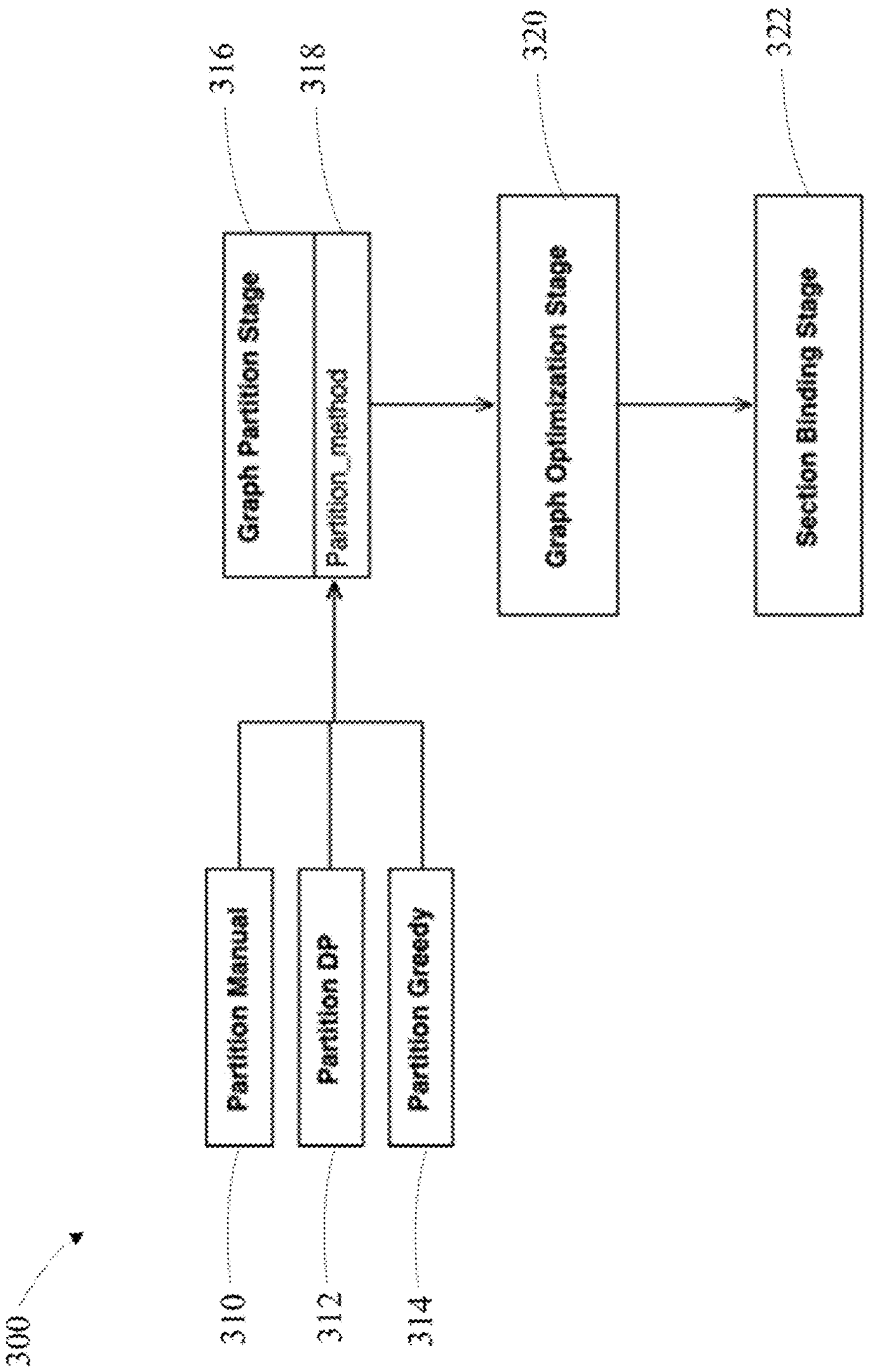
FIG. 3 is an example workflow of graph partitioning in accordance with one embodiment of the disclosure.

FIG. 3 depicts a graph partitioning workflow including a manual partition 310, a dynamic partition 312 which uses dynamic programming and a greedy partition 314 which uses a section checker function and partitions the graph into the smallest number of partitions. The graph partitioning stage 316 allows selection of the partitioning method 318. A graph optimization stage 320 may modify the partition, the execution order, the hardware section and the like for optimization and then a section binding stage 322 determines the hardware attributes to run the partitions.

Graph partitioning segments a graph into sections, the output of the various stages may be segmented graphs that include attributes. Some optimization passes may utilize previous revisions of the partitions to make further changes. In one example, the replacement of a fused addition node with an estimated add node may result in an expanded addition optimizer that relies on the input node stripe size and output node stripe size determined during a graph partitioning to further insert a penalty such as the addition of a convolutional 1×1, permutation and pool node.

The section binding stage reexamines the hardware attributes. The graph structure may change after graph optimization, leading to changes in hardware attributes. The section binding stage insures that the sections are valid for generating the directed acyclic graph and that the C code passes the profiling mode. With profiling comparison enabled, it may also generate comma separated value files in the stage result for a directory profiling folder in the baseline node performance and baseline section performance sections.

Partitioning may be an iterative process calling different partitioning methods multiple times. Libraries provide rule based partition methods such as those based on hardware limitations and a cost function based partition methods may be based on a hardware utilization ratio and the like. The user may decide on a particular partition method execution order called out by a data-serialization language file configuration.

There may be multiple partitioning methods utilized. A manual partition may be based on the configuration which contains the boundaries. The boundary may be the last node of the section. The boundaries may include the last node name and section input parameters. A dummy partition may create a single section with the nodes in a section, the number of sections is 1. An extreme partition may partition the graph into sections with sections containing one node where the number of nodes equals the number of sections.

A greedy partition may be based on a section classes checker function to check the rules that validate the section. Greedy searches the nodes to assign the section start and end indexes. It may take approximately O(n) time, where n is the number of the nodes. A dynamic programming partition may partition the same as the greedy partition. In comparison, it uses dynamic programming which results in O(n^2) time.

A greedy partition attempts to make the number of sections as small as possible, the greedy partition method has a section list and has loop sections within the section list, starting at zero and ending at one. The greedy partition finds the largest end-while node list from start to end that meets the hardware limitation checker. New sections having a start and end are appended to the section list, which starts at the end of the first section list and goes to the end plus one, and returns a new section list. The complexity of the greedy partition may take time O(n*x*y) while n is node number, x is stripe size x choices number, y is stripe size y choices number for a worst case.

Figure 4:
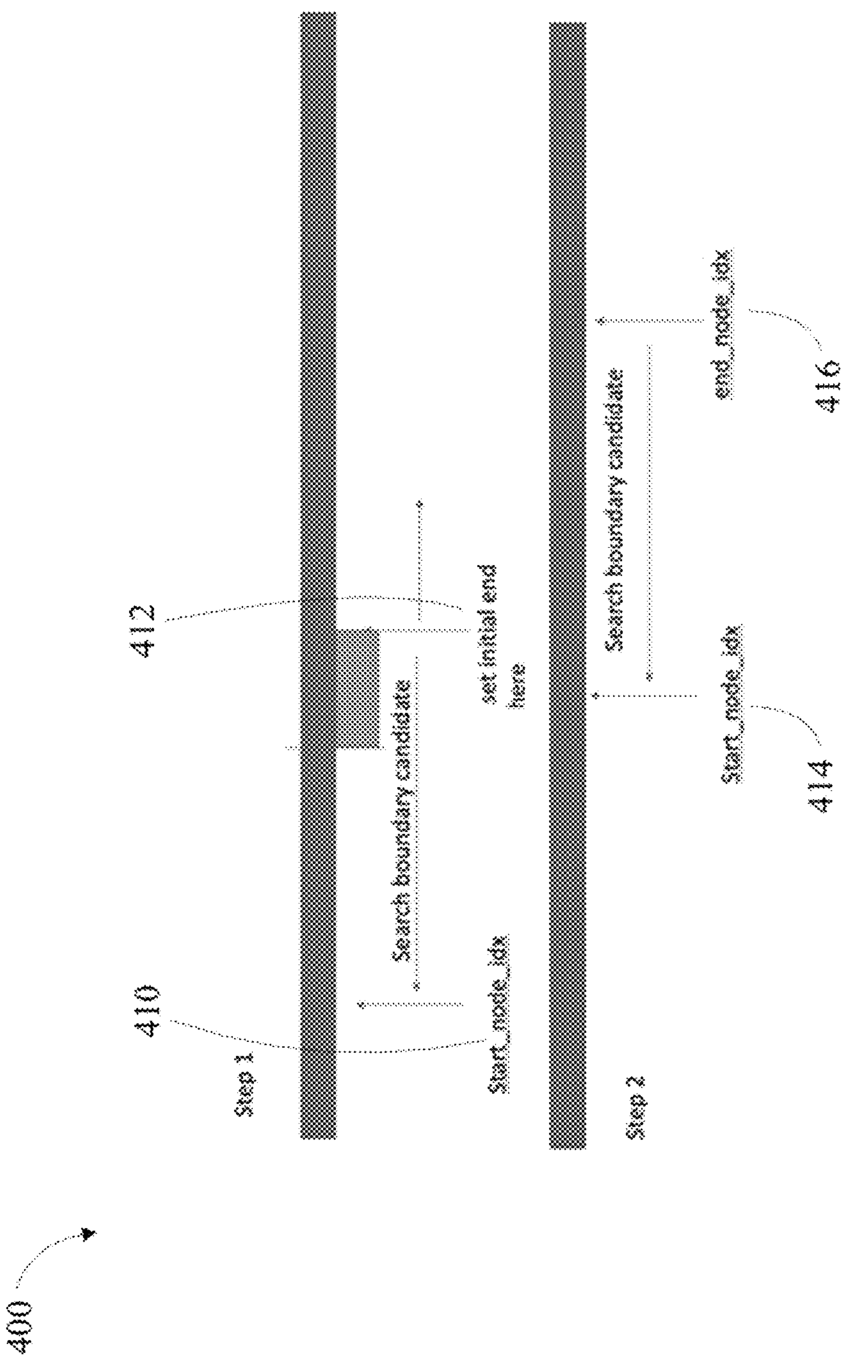
FIG. 4 is an example boundary candidate search in accordance with one embodiment of the disclosure.

FIG. 4 depicts a boundary candidate search for a boundary candidate. The boundary candidate search sets a start node identity 410 and sets an initial end 412, and from the start node identity 414 searches for an end node identity 416.

The section checker may be rule based, where the rules are registered and grouped by category. The section checker may check byte tensor move mask and weight overflow and check the byte tensor direct memory access input and output overflow. The section checker may check the overlap buffer size overflow and check the data buffer of node input values and node output values size overflow. The section checker may check to insure the input tensor and output tensor number are less than a predetermined limit.

The section checker may also check the output tensor stripe size for the section and return an error if it fails. The output tensor stripe size insures that the normal node stripe size is greater than the kernel size. The sections last node last stripe size is less than or equal to the normal stripe size. The sections last node first stripe size is greater or equal to a minimum first stripe size if the number of stripes is greater than one. The normal node stripe size is a multiple of 4. The section checker may check the memory access rules, the section output is not used by section nodes. The section checker may check the input tensor shape. In one example a first section DMA_IN have the same height and width. In a second example, (first DMA_IN shape 1/second DMA_IN shape 2) may be 1, 2, 4 or 8.

The byte tensor move mask and weight (BTMW) usage checker, moves the directed acyclic graph, move mask and weight from the memory to the BTMW. The entire directed acyclic graph may be loaded into the BTMW when the system receives the start signal, while the move mask and weight are loaded section by section. The compiler insures that the move mask size and weight of the current section plus the directed acyclic graph does not exceed the BTMW size. The individual sizes may be multiples of 64 Bytes. The move mask is not considered part of the neural network exchange (NNX).

The directed acyclic graph size may be constrained to a predetermined size such as 128 KB. Node have a weight size function, which returns the packed weight size of the node. The section weight size is a sum of the sections nodes weight sizes and it is utilized as the BTMW_USEAGE.

The byte tensor direct memory access input and output (BTMD) usage checker, utilizes the BTMD stored input tensor (DMA_IN) and output tensor (DMA_OUT). The BTMD stores the tensor stripe and is divided into multiple lanes and the compiler insures that the tensor stripe fits into the lane. BTMD usage checker determines the number of BTMD lanes from input tensor number and the output tensor number. When determining the input tensor stripe and the output tensor stripe in the BTMD. The BTMD stripe pitch in the z-direction, the combined z and x-direction and the y-direction may be found in which the final stripe size is the BTMD stripe pitch in the combined z and x direction multiplied by the pitch in the y-direction.

The overlap buffer size checker utilizes the overlap buffer to determine the overlap data between stripes. Different node types have different determination methods for determining the overlap buffer that depend upon the stripe. The section maximum of node input values and node output values are determined across the nodes in that section.

Figure 5:
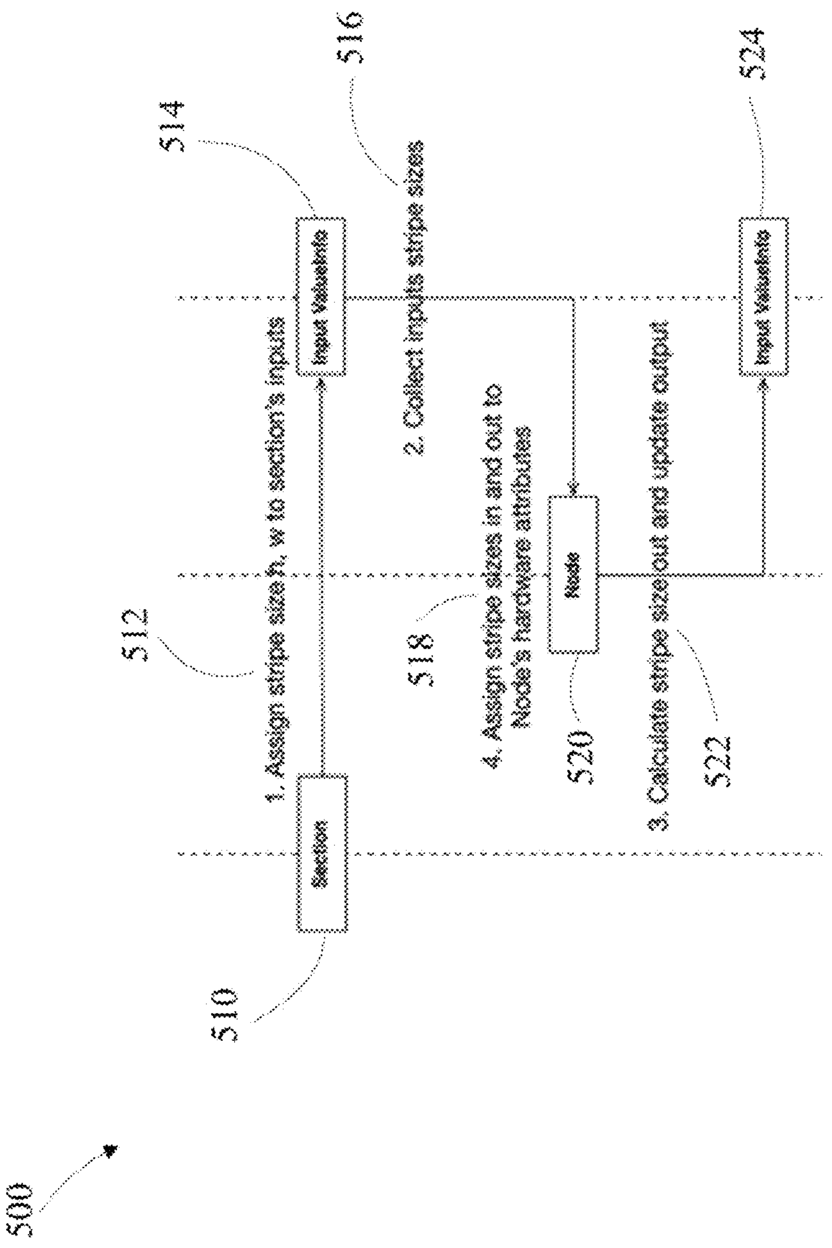
FIG. 5 is an example stripe size assignment workflow in accordance with one embodiment of the disclosure.

FIG. 5 depicts a stripe size assignment workflow includes starting at a section 510 and assigning 512 a stripe size height and width to the section inputs and outputs an input value 514. A collection 516 of the input stripe sizes is performed and assigns 518 stripe sizes IN and OUT to the node 520 hardware attributes. A determination 522 is made of the output stripe size and updates the output to the input value 524.

Stripe size assignment workflows may include setting the section's stripe size, represented as DMA_IN's input tensor stripe size. In the directed acyclic graph, section have a direct memory access input tensor (DMA_IN) and direct memory access output tensor (DMA_OUT) defined at the outset. The workflow may determine the hardware attributes based on the input tensor stripe size, output tensor stripe size, input node stripe size, output node stripe size, BTMD usage, OVBUF size and DBUF. The workflow may assign the section input tensor stripe based on section first input tensor. The normal stripe sizes may be set for the input node stripe size and output node stripe size.

The stripe window may be moved in a sawtooth pattern in the vertical direction and at each stripe position, a determination may be made of the section input tensor stripe size, output tensor stripe size, input node stripe size and output node stripe size. The previous x-position count and y-position count may be inherited for next stripe position. A determination is made for the x-direction and y-direction as to whether the stripes are in range. A stripe in that section has assigned to it a top, a bottom, and a last position in the x-direction and a last position in the y-direction to represent the location of the stripe. With respect to the input tensor for that section, the input tensor stripe size is set and the hardware attributes are updated to reflect input tensor stripe size. The hardware attributes may also reflect the input node and the output node for that section, the input node stripe size and output node stripe size. The input node stripe sizes and output node stripe sizes may be assigned as the node input stripe size and node output stripe size in hardware attributes. After the hardware attributes are determined, the section checker may determine whether the section is valid.

Figure 6:
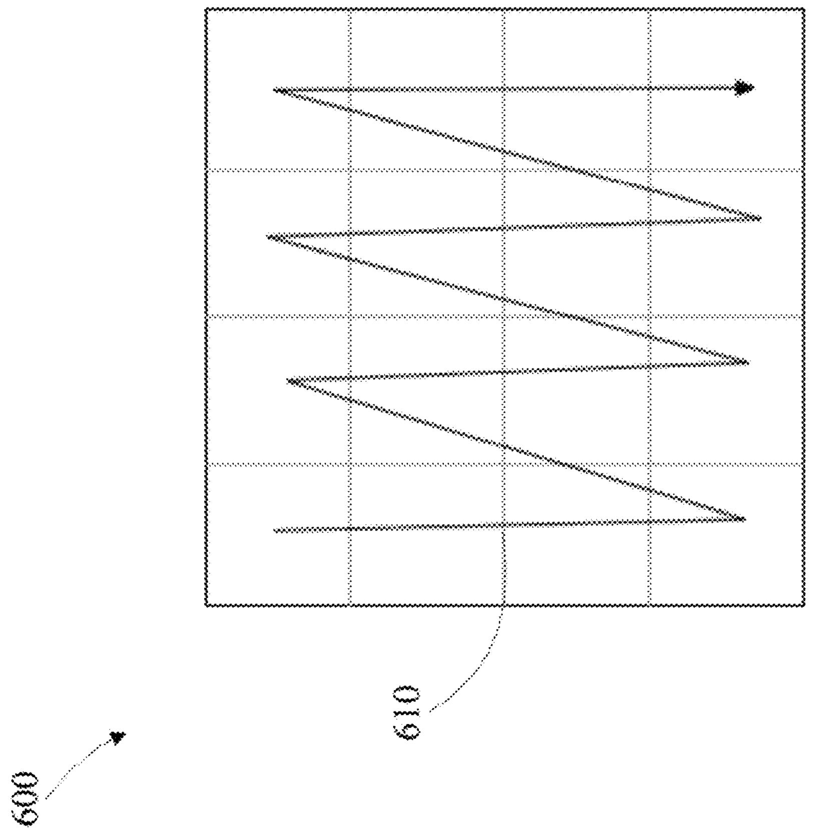
FIG. 6 is an example sawtooth search for stripe size in accordance with one embodiment of the disclosure.

FIG. 6 depicts an example sawtooth search for stripe size in which the stripe sizes are determined in a sawtooth pattern 610.

Figure 7:
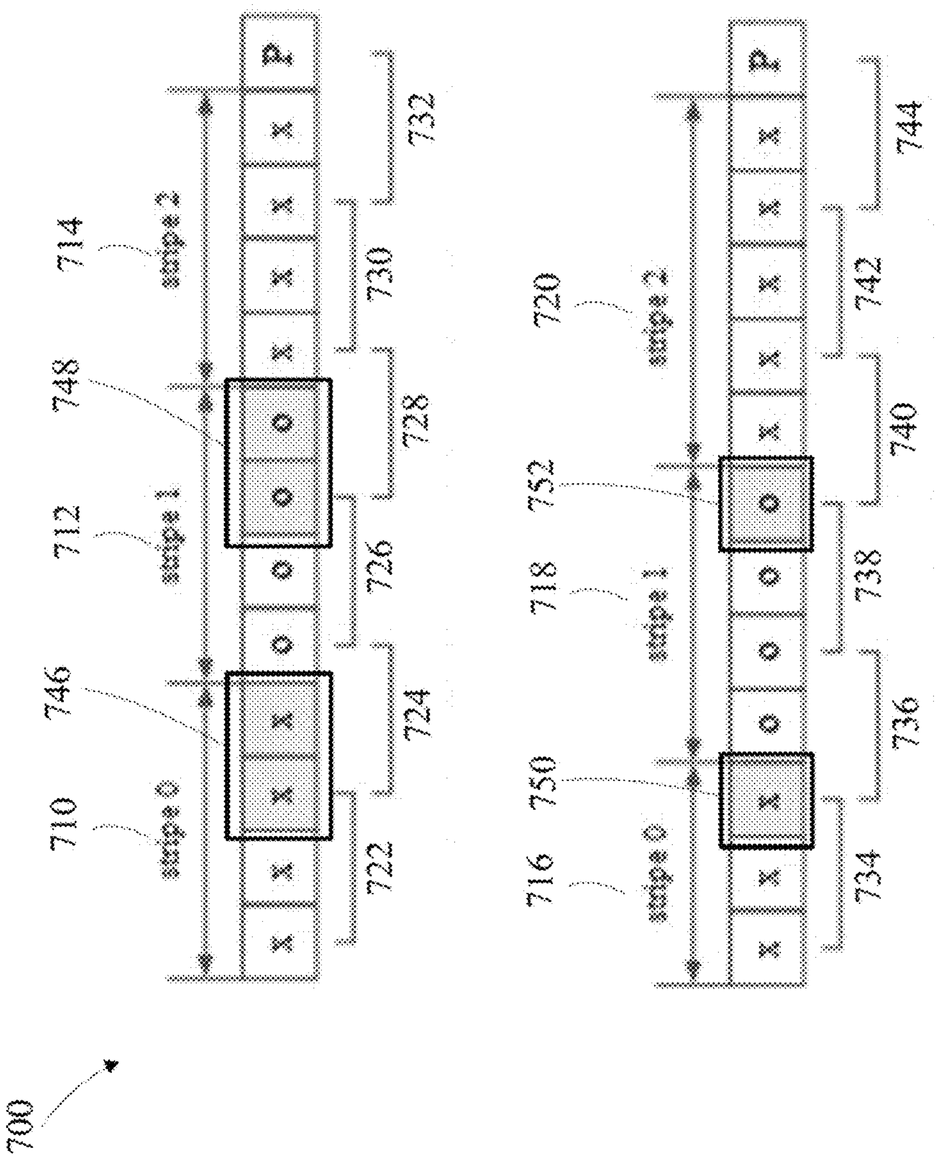
FIG. 7 is an example of updating a stripe versus a previously saved stripe in accordance with one embodiment of the disclosure.

FIG. 7 depicts a previously saved stripe 0; 710, stripe 1; 712 and stripe 2; 714. The previously save stripes have strides of 2, 722, 724, 726, 728, 730 and 732. Blocks 746 and 748 depict an overlap of size 2. The size of previously save stripes 710, 712 and 714 is 4. The shaded blocks may be used in the next stripe based on the previous stripe. The next stripe includes stripe 0; 716, stripe 1; 718 and stripe 2; 720. The new stripes have a stride of 2, 734, 736, 738, 740, 742 and 744. Blocks 750 and 752 have an overlap of size 1. The size of the new stripes 716 is 3, 718 is 4 and 720 is 5.

Figure 8:
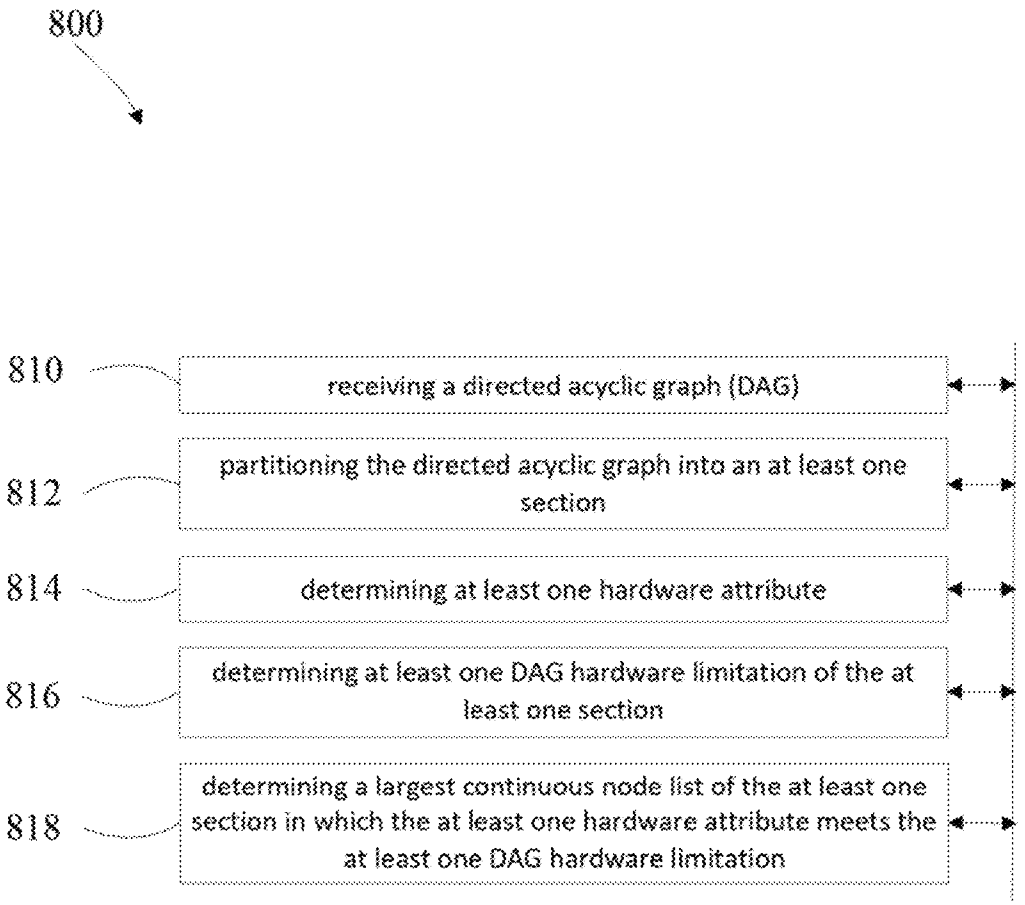
FIG. 8 is a first example method of graph partitioning in accordance with one embodiment of the disclosure.

FIG. 8 depicts an example method of constructing sub-graphs, including receiving 810 a directed acyclic graph (DAG), partitioning 812 the directed acyclic graph into an at least one section and determining 814 at least one hardware attribute. The method also includes determining 816 at least one DAG hardware limitation of the at least one section and determining 818 a largest continuous node list of the at least one section in which the at least one hardware attribute meets the at least one DAG hardware limitation.

Figure 9:
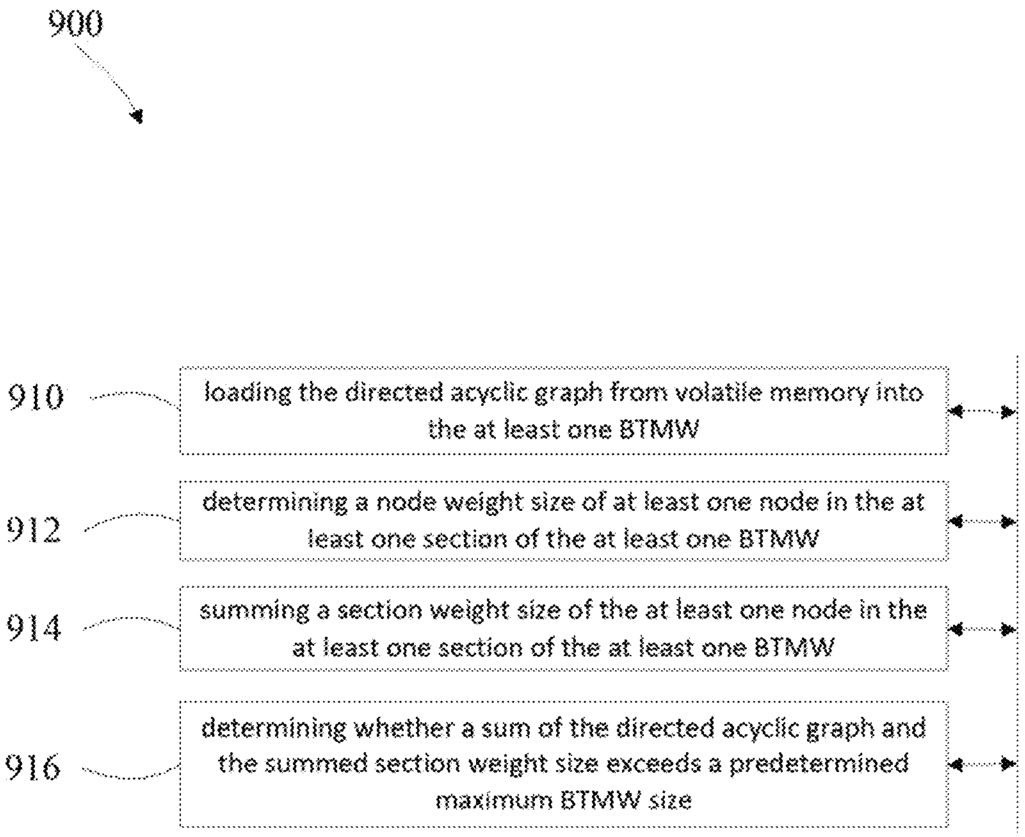
FIG. 9 is a second example method of graph partitioning in accordance with one embodiment of the disclosure.

FIG. 9 depicts an example method of constructing sub-graphs, including loading 910 the directed acyclic graph from volatile memory into the at least one BTMW, determining 912 a node weight size of at least one node in the at least one section of the at least one BTMW, summing 914 a section weight size of the at least one node in the at least one section of the at least one BTMW and determining 916 whether a sum of the directed acyclic graph and the summed section weight size exceeds a predetermined maximum BTMW size.

Figure 10:
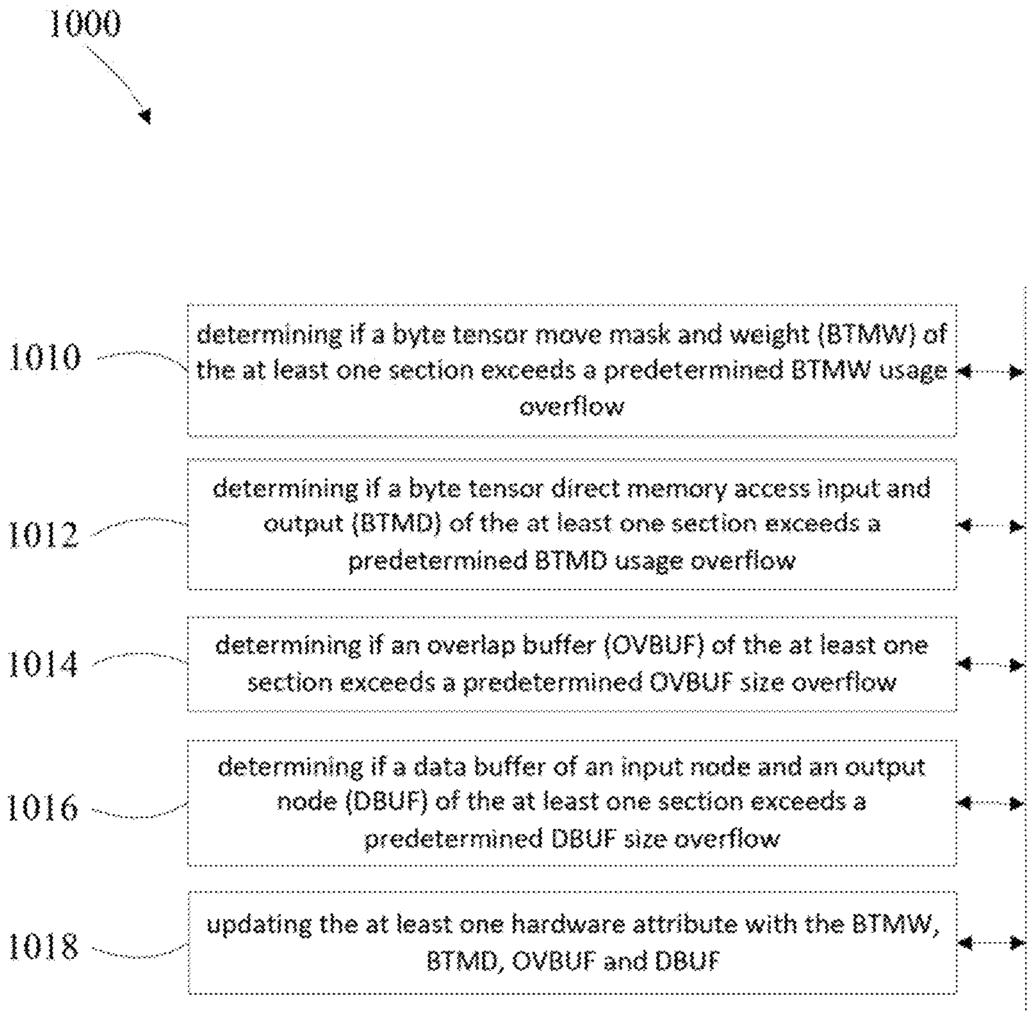
FIG. 10 is a third example method of graph partitioning in accordance with one embodiment of the disclosure.

FIG. 10 depicts an example method of constructing sub-graphs, including determining 1010 if a byte tensor move mask and weight (BTMW) of the at least one section exceeds a predetermined BTMW usage overflow and determining 1012 if a byte tensor direct memory access input and output (BTMD) of the at least one section exceeds a predetermined BTMD usage overflow. The method may also include determining 1014 if an overlap buffer (OVBUF) of the at least one section exceeds a predetermined OVBUF size overflow, determining 1016 if a data buffer of an input node and an output node (DBUF) of the at least one section exceeds a predetermined DBUF size overflow and updating 1018 the at least one hardware attribute with the BTMW, BTMD, OVBUF and DBUF.

The method of constructing sub-graphs may further include loading an at least one stripe of an input tensor and an output tensor and determining whether the at least one stripe exceeds a predetermined stripe size and determining if an input tensor number exceeds a predetermined input tensor number limit. The method may further include determining if an output tensor number exceeds a predetermined output tensor number limit and determining if a section output tensor stripe size exceeds a predetermined output tensor stripe size limit. The overlap buffer may store an overlap data between the stripes.

Figure 11:
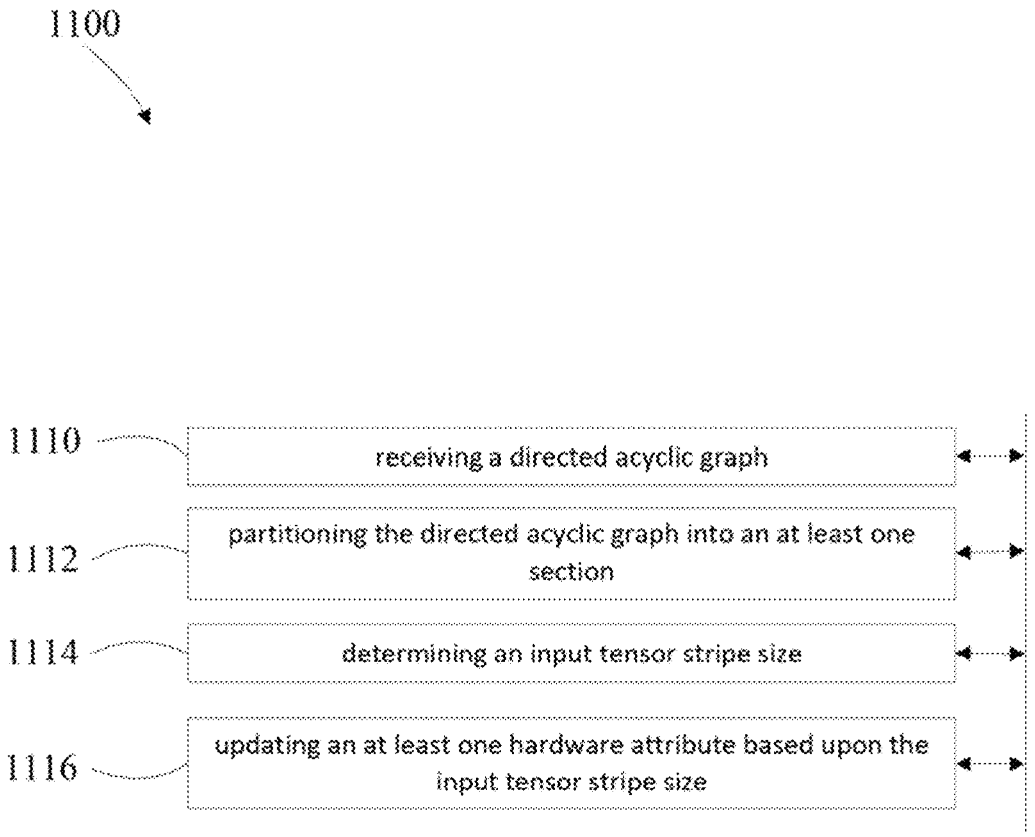
FIG. 11 is a first example method of assigning a stripe size in a sub-graph in accordance with one embodiment of the disclosure.

FIG. 11 depicts an example method of assigning a stripe size in a sub-graph including receiving 1110 a directed acyclic graph, partitioning 1112 the directed acyclic graph into an at least one section, determining 1114 an input tensor stripe size and updating 1116 an at least one hardware attribute based upon the input tensor stripe size.

The method of assigning a stripe size in a sub-graph may further include determining if a byte tensor move mask and weight (BTMW) of the at least one section exceeds a predetermined BTMW usage overflow and determining if a byte tensor direct memory access input and output (BTMD) of the at least one section exceeds a predetermined BTMD usage overflow. The method may further include determining if an overlap buffer (OVBUF) of the at least one section exceeds a predetermined OVBUF size overflow, determining if a data buffer of an input node and an output node (DBUF) of the at least one section exceeds a predetermined DBUF size overflow and updating the at least one hardware attribute with the BTMW, BTMD, OVBUF and DBUF.

Figure 12:
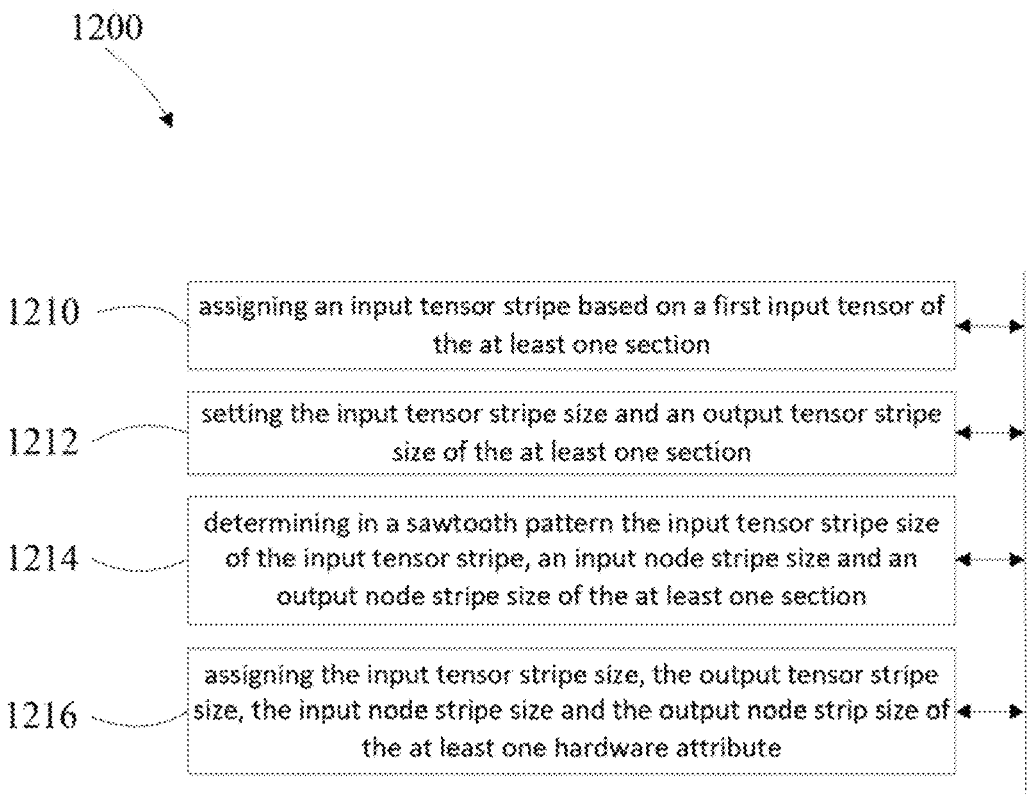
FIG. 12 is a second example method of assigning a stripe size in a sub-graph in accordance with one embodiment of the disclosure.

FIG. 12 depicts an example method of assigning a stripe size in a sub-graph, including assigning 1210 an input tensor stripe based on a first input tensor of the at least one section and setting 1212 the input tensor stripe size and an output tensor stripe size of the at least one section. The method may further include determining 1214 in a sawtooth pattern the input tensor stripe size of the input tensor stripe, an input node stripe size and an output node stripe size of the at least one section and assigning 1216 the input tensor stripe size, the output tensor stripe size, the input node stripe size and the output node stripe size of the at least one hardware attribute.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of constructing sub-graphs, comprising:

receiving a directed acyclic graph (DAG);

partitioning the directed acyclic graph into an at least two sections;

determining at least one hardware attribute;

determining at least one DAG hardware limitation of the at least two sections;

determining a largest continuous node list of the at least two sections in which the at least one hardware attribute meets the at least one DAG hardware limitation;

executing the sections on a processor, wherein the section is a subnetwork of a neural network;

determining if an at least one byte tensor move mask and weight (BTMW) of the at least two sections exceed a predetermined BTMW usage overflow; and updating the at least one hardware attribute with the at least one BTMW.

2. The method of constructing sub-graphs of claim 1, further comprising:

loading the directed acyclic graph from volatile memory into the at least one BTMW;

determining a node weight size of at least one node in the at least two sections of the at least one BTMW;

summing a section weight size of the at least one node in the at least two sections of the at least one BTMW; and determining whether a sum of the directed acyclic graph and the summed section weight size exceeds a predetermined maximum BTMW size.

3. The method of constructing sub-graphs of claim 1, further comprising determining if an at least one byte tensor direct memory access input and output (BTMD) of the at least two sections exceed a predetermined BTMD usage overflow.

4. The method of constructing sub-graphs of claim 3, further comprising:

loading an at least one stripe of an input tensor and an output tensor; and determining whether the at least one stripe exceeds a predetermined stripe size.

5. The method of constructing sub-graphs of claim 3, further comprising determining if an overlap buffer (OVBUF) of the at least two sections exceeds a predetermined OVBUF size overflow.

6. The method of constructing sub-graphs of claim 5, wherein the overlap buffer stores an overlap data between at least one stripe.

7. The method of constructing sub-graphs of claim 3, further comprising determining if a data buffer of an input node and an output node (DBUF) of the at least two sections exceeds a predetermined DBUF size overflow.

8. The method of constructing sub-graphs of claim 7, further comprising determining if an input tensor number exceeds a predetermined input tensor number limit.

9. The method of constructing sub-graphs of claim 8, further comprising determining if an output tensor number exceeds a predetermined output tensor number limit.

10. The method of constructing sub-graphs of claim 9, further comprising determining if a section output tensor stripe size exceeds a predetermined output tensor stripe size limit.

* * * * *